UNITED STATES PATENT OFFICE 2,147,489

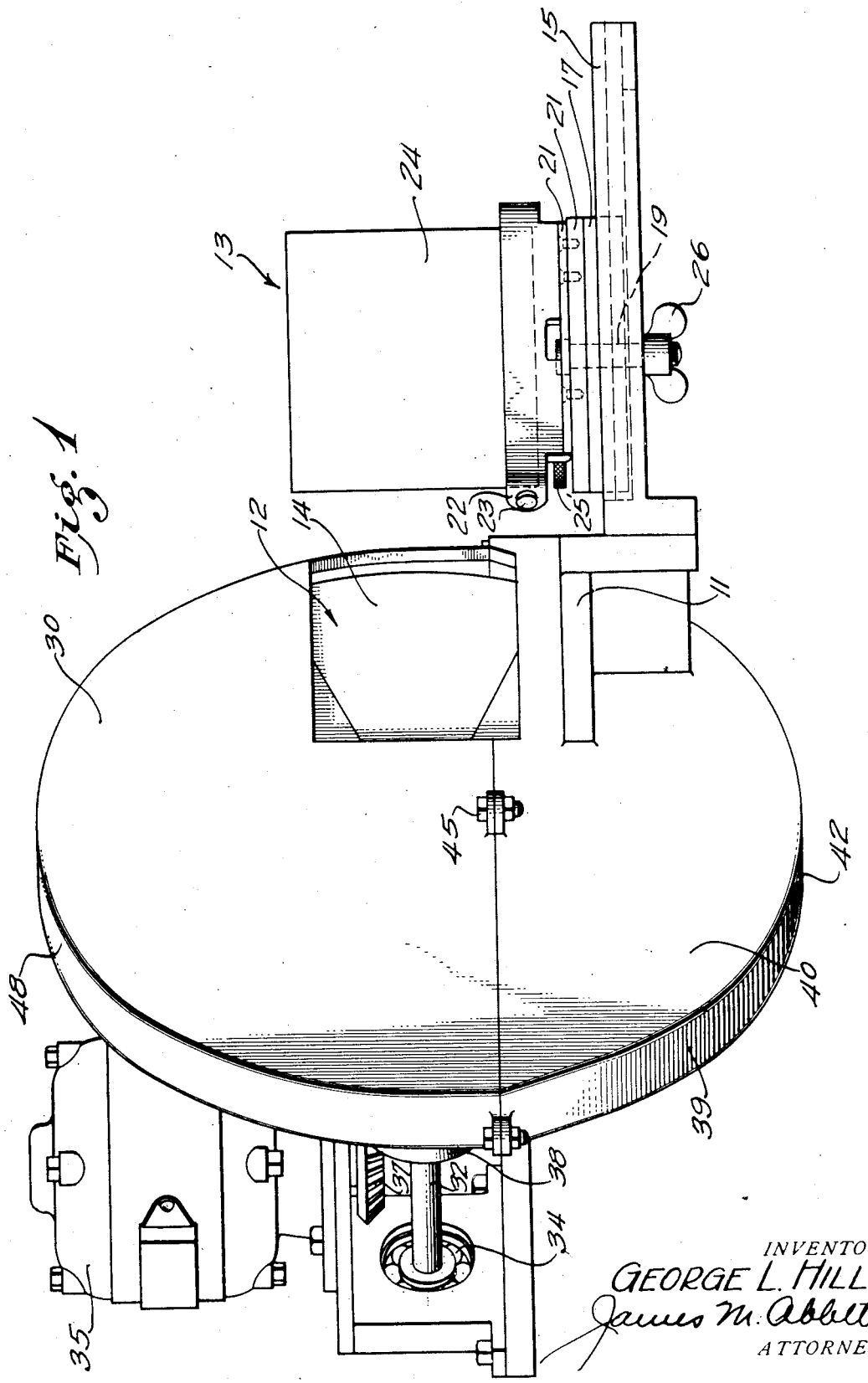

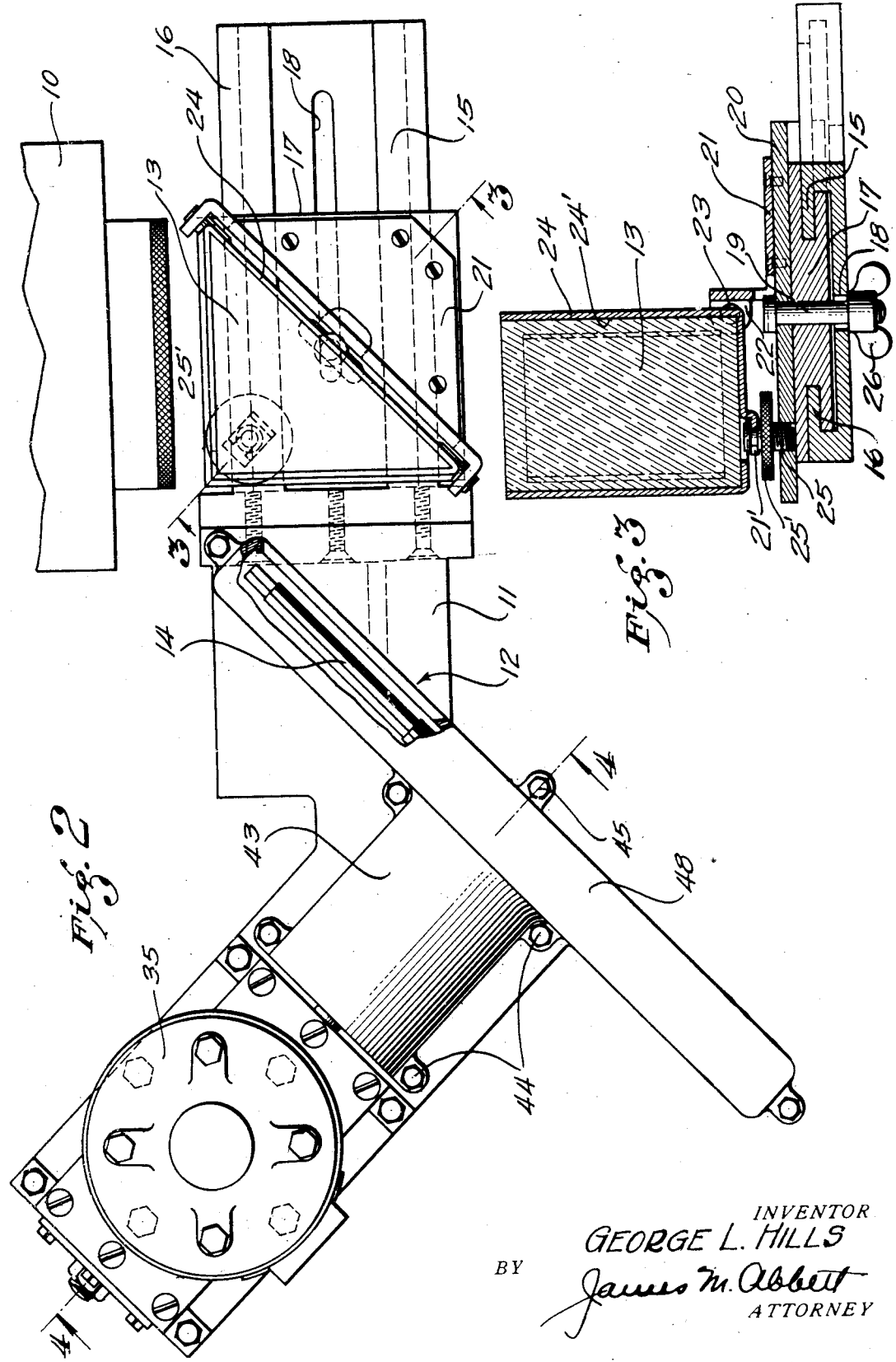

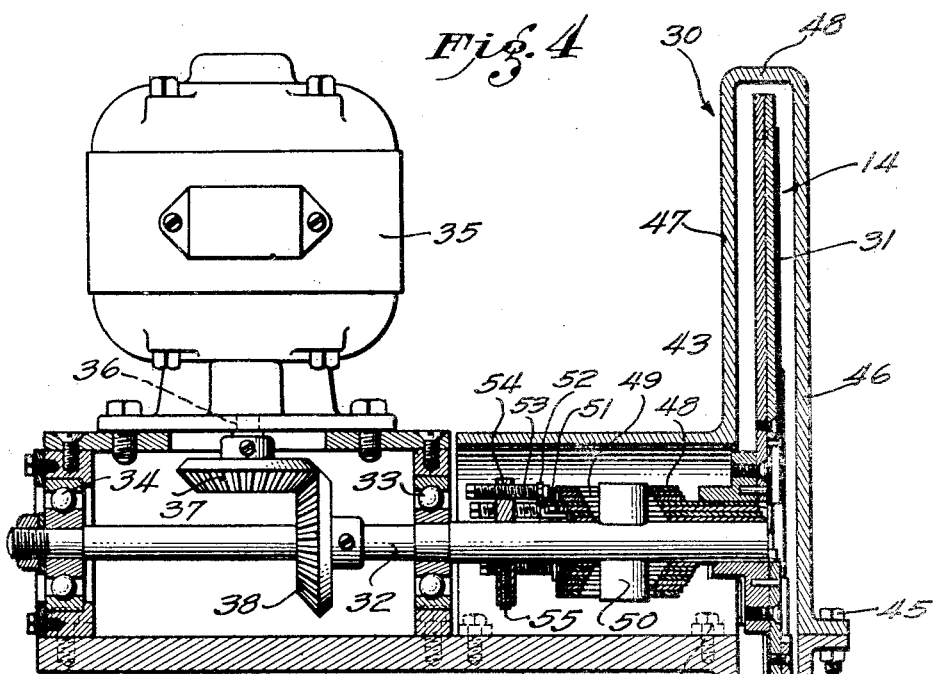
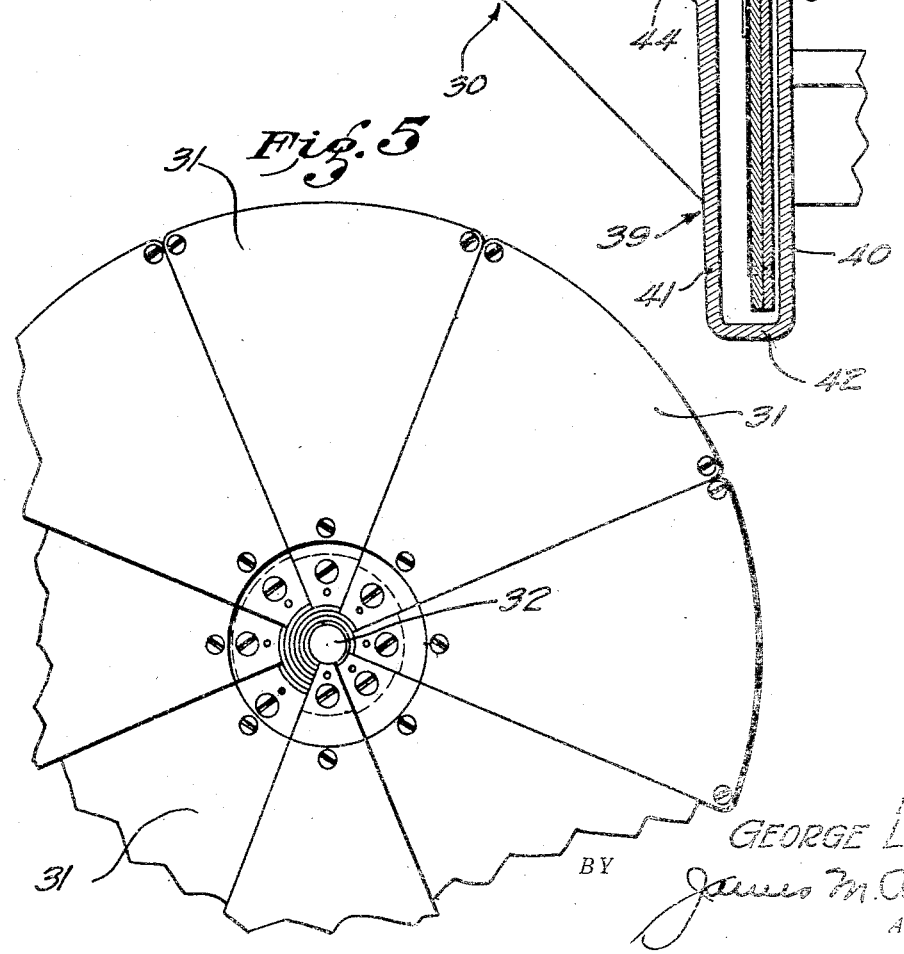

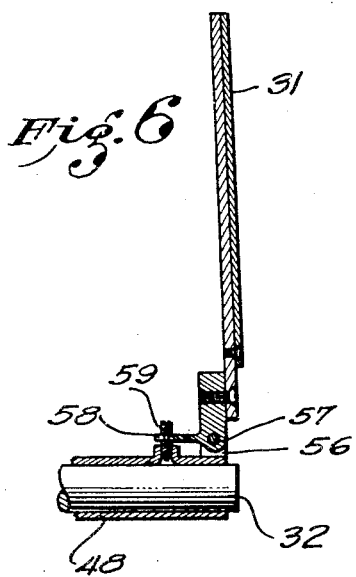
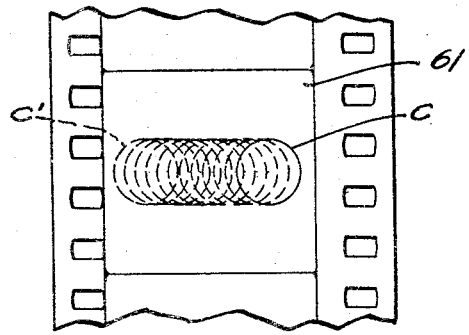
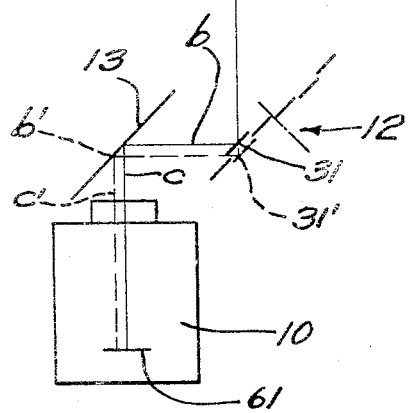

MULTIPLE REFLECTOR STEREOSCOPIC CAMERA

George L. Hills, San Bernardino, Calif., assignor to Dimensional Pictures Incorporated, Los Angeles, Calif., a corporation of California Application April 2, 1935, Serial No. 14,232
Renewed June 25, 1938

6 Claims. (Cl. 88—16.6)

This invention relates to a multiple reflector stereoscopic camera and particularly pertains to a method and apparatus for producing photographs.

Various attempts have been made to produce the effect of third dimension in pictures which have been projected on a screen to thereby give illusion of depth to the photographic scene. The apparatus which so far has been developed for this class of work for the most part contemplates the taking of successive views of the subject from alternate optical angles and then successively projecting the views on a moving picture screen with sufficient rapidity to cause the illusion of depth to be created due to the phenomena of the persistence of vision. The apparatus required for obtaining pictures of this type is usually quite cumbersome and also requires the provision of special projecting apparatus. It is the principal object of the present invention to provide a camera by which motion pictures may be taken, said camera being simple in construction and operation without requiring any binocular photographic apparatus while preparing a photographic film which may be projected on to the screen by the ordinary type of motion picture projecting machine, and without any special manipulation of the machine or different care in the feeding or handling of the film, or in the preparation and construction of the screen.

The present invention contemplates the provision of a camera operating in conjunction with which a multiple angle reflector is used, said reflector receiving light beams from a photographic image with great rapidity and thus causing a plurality of superposed exposures to be made upon a single frame of motion picture film, said exposures representing views of the photographic subject successively taken from changing optical angles with relation to each other.

The invention is illustrated by way of example in the accompanying drawings in which:

Figure 1 is a view in front elevation showing the multiple view reflector with which the present invention is concerned.

Fig. 2 is a view in plan showing the multiple view reflector with parts broken away and further disclosing its relationship to a camera which is used in connection with the reflector.

Fig. 3 is a view in transverse vertical section through an adjustable reflecting member interposed between the camera and the multiple reflector as seen on the line 3—3 of Fig. 2.

Fig. 4 is a view in central longitudinal section through the multiple view reflector as seen on the line 4—4 of Fig. 2.

Fig. 5 is an enlarged fragmentary view showing the adjustable hub of the multiple view reflector element with the case of the reflector element removed.

Fig. 6 is a fragmentary view in vertical section and elevation showing means whereby a reflector may be individually adjusted toward and away from a normal plane at right angles to the axis of rotation of the multiple reflector.

Fig. 7 is a view in diagram showing the manner in which the light beam travels to the reflector.

Fig. 8 is an enlarged view of a frame of a motion picture film indicating the manner in which successive images of a disc would appear in the photographic field as photographed by the present apparatus.

Fig. 9 is a central view of the multiple reflecting disc taken circumferentially thereof and showing the developed length of the section with the various reflecting surfaces offset with relation to each other.

Referring more particularly to the drawings, 10 indicates a motion picture camera of any preferred design. Suitably supported in front of the camera is a base plate 11 of a multiple reflecting unit 12. This base plate extends horizontally and provides a support for an adjustable reflector 13 as well as a multiple rotary reflector 14. The portion of the base plate supporting the adjustable reflector 13 is formed with guide ways 15 and 16 along which a block 17 slides. The slotted opening 18 is formed lengthwise of the base plate 11 and between the guide members 15 and 16. This slot receives a lock bolt 19 which extends upwardly through the block 17 and through a top plate 20. The top plate 20 carries an angle plate 21 formed at its opposite ends with ears 22 to receive pivot pins 23. Pivotally mounted between these pins is a frame 24 carrying a reflecting plate 24'. The horizontal plate 20 may be rotated with relation to the pin 19 and may be set in position by the wing nut 26 so that the horizontal angle of the reflector 24' may be readily varied with relation to the light beam projected into the camera 10. A vertical adjustment is also provided for the reflector 24' which comprises an adjusting screw 25 threaded into the top plate 20 and having a shoulder engaging a fork member 21' carried by the bottom of the reflector frame 24. An adjusting nut 25' is provided for operating the screw. As shown in Fig. 2 of the drawings the reflector frame normally is disposed diagonally of the top plate 20 and diagonally of the base plate 11. The adjusting screw 25 is disposed at a corner of the top plate 20 and at right angles to the horizontal axis provided by the pins 23. In this way the reflecting member 24' and its frame 24 may be readily adjusted vertically as required to frame the photograph properly. The base plate 11 is formed integral with the housing 30 of the rotary multiple reflector 14. This reflector comprises a plurality of disc segments 31 disposed radially of a shaft 32 which is mounted to rotate within anti-friction ball bearings 33 and 34. These bearings are secured within the housing 30. Mounted upon the rear portion of the housing 30 is a motor 35 by which the shaft 32 may be driven. This motor has a vertical shaft 36 carrying a pinion 37 which is in mesh with a pinion 38 carried on the shaft 32. The motor may be operated at any desired speed but in practice it has been found that if it operates to cause the shaft 32 to rotate at a speed of the order of 5000 revolutions a minute the resulting action will be satisfactory. The housing 30 is formed with a lower half 39 having a front wall 40 and a rear wall 41. These walls are connected by an arcuate semi-circular side wall 42. Between the walls 40 and 41 the lower portion of the rotating reflector is enclosed within a top cover 43 which is held in place by fastening screws 44 and bolts 45. The top cover comprises a front wall 46 in the rear wall 47 in the plane of the wall 41. An arcuate substantially semi-circular edge wall 48 connects the walls 46 and 47 and combines with the wall 42 to provide a circular circumscribing wall for the rotary reflector 14.

The reflector 14 as previously stated, is formed of a plurality of reflector segments. The assembled set of segments forms a complete disc. The individual segments, however, are designed to be shifted longitudinally of the shaft 32 so that they may be set to reflect in different planes which progressively shorten and increase the length of the light beam from the object to the reflecting surface and thus shift the photographic image imposed upon the photographic field, as will be hereinafter explained. The segments 31 are each mounted on a sleeve 48. The sleeves telescope one within the other. Each of the tubular sleeves 48 is formed with a longitudinally extending slot 49 which receives a driving key 50. The key 50 extends transversely through the shaft 32. At the rear of each sleeve is formed an extension 51 having an ear 52 on it to receive an adjusting screw 53. The adjusting screws are separately carried by fastening collars 54 which are set on the shaft 32 by set screws 55. The adjusting screws 53 extend parallel to the longitudinal axis of the shaft 32 and thus make it possible for the individual sleeves 48 and the reflecting members 31 associated therewith to be shifted longitudinally of the shaft 32 for the purpose of adjustably setting the reflecting face of the segments 31 and thus properly changing the point at which the light beams striking the several reflectors 31 will strike the adjustable reflector 13. It also may be desirable to adjust the segments 31 individually by swinging them in a plane intersecting the longitudinal axis of the shaft 32 and normal thereto. This is accomplished by providing each of the sleeves 48 with a mounting lug 56 carrying a pivot pin 57 by which the corresponding reflecting segment 31 is pivoted to the sleeve. Each of the segments 31 is also provided with an adjusting arm 58 extending substantially at right angles to the segment and carrying an adjusting screw 59 by which the segment may be rocked on its pivot.

In operation of the present invention it will be assumed that the reflecting disc 14 has its separate segments 31 so adjusted as to progressively stand in offset relation to each other in succeeding planes away from and toward the plane of the foremost disc. In the drawings eight discs are shown.

Fig. 9, which is a central view taken circumferentially of the disc 14 shows the developed length of the section. In this view it will be seen that the separate reflectors stand in stepped relation toward each other, thus providing reflecting surfaces which successively move toward and away from the photographic object indicated as a disc at 6 in Fig. 7 of the drawings. The light beam $a$ will be directed toward the disc 14 which is constantly rotated by the motor 35 at a relatively high rate of speed. In practice 5200 revolutions have been found to be a suitable speed. This beam will be deflected by one of the reflecting segments 31 as indicated at $b$ in Fig. 7, and will strike the adjusting reflector 13 where it will then travel as indicated by the solid lines $c$ in Fig. 7. This last beam length will be projected into the camera and on to the photographic field of the film indicated at 61 in Fig. 8. Assuming that the reflecting segment 31 which receives the light beam $a$ is in the foremost plane, and that the succeeding segments will move from this plane, one of which is indicated at 31' in Fig. 7, it will be evident that the light beam $a$ will be of greater length and that the beam $b$ will shift away from the object as indicated by the reference character $b'$. The beam $c$ thus will shift laterally of the photographic film 61 to the path of travel as indicated by the reference character $c'$ in Fig. 7 of the drawings. The beams of light will therefore fall upon the film in successively laterally shifted positons from that indicated by the reference character $c$ in Fig. 8 of the drawings to that indicated by reference character $c'$ in Fig. 8. Spacing of the intermediate light beam images will be a relatively short distance apart, but their position of spacing is magnified in Fig. 8 for the purpose of illustration. Assuming that the photographic film is being fed through the camera at the rate of twenty-four frames per second, and that the rotary reflecting disc 14 is moving at the rate of speed of 5200 revolutions per minute while carrying eight reflectors, it will be seen that more than 1700 separate images will be imposed on each frame of the film and it has been found in practice that due to this method of making film, the projected film as used with the ordinary projecting machine will produce the picture on the projection screen which is of excellent delineation, and which through some peculiar optical phenomena gives the effect of depth in the picture.

In some instances it may be desirable to tilt the separate reflecting segments 31 and this may be done by the adjusting screws 59 as shown in Fig. 6. When the camera is set up for use it is sometimes found that the images do not register properly with the frames of the film and in order to frame them properly the adjustable reflector 13 may be rotated on the axis of the set screw 19, or it may be tilted by adjustment of the screw 25. When this adjustment has been made the light beams will properly strike the photographic surface of the film in proper position to produce the picture desired. The action obtained by the rapid rotation of the reflector 14 is to progressively and recurrently lengthen and shorten the light beam eminating from the photographic object and striking the rotary reflector. When the picture is projected on the screen thereafter the different exposures have the effect of rapidly moving the observer toward and away from the scene displayed thereby producing the illusion of depth in the picture.

It will thus be seen that the structure here disclosed while simple in construction and operation, may be used in connection with a motion picture camera to produce photographs which when projected in succession on a screen by an ordinary projecting apparatus will create the illusion of depth.

While I have shown the preferred form of the method of producing the effect of depth in motion pictures and an apparatus by which it can be accomplished, it is to be understood that various changes in the method might be made, as well as changes in the detail of combination, construction and arrangement of parts of the apparatus, by those skilled in the art, without departing from the spirit of the invention as claimed.

Having thus described my invention, what I claim and desire to secure by Letters Patent is:

1. An apparatus for producing motion pictures having a stereoscopic effect which consists in combination with a motion picture camera, rotating reflecting means carrying a plurality of separate reflecting segments successively interposed between the photographic object and the camera and adapted to rapidly lengthen and shorten the beam of light passing from the photographic object to the camera and means acting to move the various reflecting segments through the light beam during each exposure of the film whereby a succession of superposed photographs of a subject at different angles of a progressively increasing and decreasing series in relatively small increments of change will be made on each frame of the film.

2. In combination with a camera, a device adapted to produce a photograph for projection on a screen, said device comprising a segmental rotary reflector having segments arranged in a series of progressively increasing and decreasing angles against which segments the beam of light eminating from the photographic object strikes and by which the length of said beam of light is rapidly increased in successive relatively small increments and likewise rapidly decreased, a reflecting member by which the beams of light from the rotary reflector may be directed into the camera and in focus therewith, whereby a succession of photographic exposures will be made of the photographic object upon each frame of the film and means acting to move the various reflecting segments through the light beam during each exposure of the film.

3. In combination with a relatively fixed motion picture camera, means for superimposing upon each frame of a motion picture film a relatively large number of separate exposures at angles of a progressively increasing and decreasing series for creating a stereoscopic effect in a projected picture photographed thereby, said means comprising a rotary reflector having a plurality of separate radial segments each adapted to be successively spaced in separate transverse planes longitudinally of the rotary axis of the reflector and upon which separate reflecting segments a light beam emanating from a photographic subject may fall, means for driving said rotary reflector to move the various reflecting segments into the path of said light beam during each exposure of the film a relatively fixed reflector interposed in the path of the light beams eminating from the segments of the rotary reflector and by which said beam may be projected into the fixed camera and on to the photographic film.

4. In combination with a motion picture camera, means for superimposing upon each frame of a motion picture film a relatively large number of separate exposures at angles of a progressively increasing and decreasing series of degrees within a recurrent cycle for creating a stereoscopic effect in a projected picture photographed thereby, said means comprising a rotary reflector having a plurality of separate radial segments adapted to be successively spaced in separate transverse planes longitudinally of the rotary axis of the reflector and upon which separate reflecting segments a light beam emanating from a photographic subject may fall, means for driving said rotary reflector to move the various reflecting segments into the path of said light beam during each exposure of the film, a relatively fixed reflector interposed in the path of the light beams emanating from the segments of the rotary reflector and by which said beam may be projected into the camera and on to the photographic film, and means for individually adjusting the reflecting segments of the rotary reflector with relation to the photographic object, whereby the separate segments may be adjusted relative to each other to produce a change in angular position between the image being photographed and the fixed reflector in successive increments reoccurring in each cycle of rotation of the reflector.

5. In combination with a motion picture camera, means for superimposing upon each frame of a motion picture film a relatively large number of separate exposures at angles of a progressively increasing and decreasing series creating a stereoscopic effect in a projected picture photographed thereby, said means comprising a rotary reflector having a plurality of radial segments adapted to be spaced in separate transverse planes longitudinally of the rotary axis of the reflector and arranged at progressively increasing and decreasing angles and upon which separate reflecting segments a light beam emanating from a photographic subject may fall, means for driving said rotary reflector to move the various reflecting segments into the path of said light beam during each exposure of the film, a relatively fixed reflector interposed in the path of the light beams emanating from the segments of the rotary reflector and by which said beam may be projected into the camera and on to the photographic film, and means for adjusting the relatively fixed reflector in horizontal and vertical planes whereby the separate segments may be adjusted relative to each other to produce a change in angular position between the image being photographed and the fixed reflector in successive increments reoccurring in each cycle of rotation of the reflector.

6. In combination with a motion picture camera disposed in a fixed position relative to a photographic image, means for creating a stereoscopic effect in a projected picture photographed thereby which comprises a fixed reflector disposed in advance of the camera, a rotary reflector disposed in a position to receive a beam of light from the image to be photographed and to project it to the fixed reflector, said rotary reflector comprising a plurality of separate radial reflecting segments progressively set with relation to the normal plane of said rotary reflector and to each other to cause the beam of light from the image being photographed to be shortened and lengthened in a reoccurring cycle of exposures of the camera represented by successive revolutions of the reflector whereby a succession of photographic exposures will be made upon the photographic film within the camera in overlapping relation to each other and relatively small increments of lateral displacement between successive exposures and means acting to move the various reflecting segments through the light beam during each exposure of the film.

GEORGE L. HILLS.